(12) United States Patent
Zhu et al.

(10) Patent No.: US 7,058,268 B2
(45) Date of Patent: Jun. 6, 2006

(54) DEPLOYABLE OPTICAL FIBER TRANSMISSION LINES, OPTICAL TRANSMISSION CABLE, AND METHOD OF MAKING SAME

(75) Inventors: Rong Zhu, Edison, NJ (US); Chung-Shin Ma, Morganville, NJ (US); Seymour Shapiro, Long Branch, NJ (US); Qian Zhong, Freehold, NJ (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 185 days.

(21) Appl. No.: 10/636,090

(22) Filed: Aug. 7, 2003

(65) Prior Publication Data

US 2005/0031274 A1 Feb. 10, 2005

(51) Int. Cl.
*G02B 6/44* (2006.01)
*G02B 6/46* (2006.01)
(52) U.S. Cl. ......................... 385/100; 385/95
(58) Field of Classification Search ............ 398/142, 398/147, 148; 385/100, 106
See application file for complete search history.

(56) References Cited

U.S. PATENT DOCUMENTS

| | | | |
|---|---|---|---|
| 5,191,631 | A | 3/1993 | Rosenberg |
| 5,894,537 | A | 4/1999 | Berkey et al. |
| 6,038,356 | A | 3/2000 | Kerfoot, III et al. |
| 6,137,604 | A | 10/2000 | Bergano |
| 6,188,823 | B1 | 2/2001 | Ma |
| 6,301,419 | B1 | 10/2001 | Tsukitani et al. |
| 6,311,002 | B1 | 10/2001 | Evangelides et al. |
| 6,317,238 | B1 | 11/2001 | Bergano et al. |
| 6,320,884 | B1 | 11/2001 | Kerfoot, III et al. |
| 6,414,786 | B1 | 7/2002 | Foursa |
| 6,421,484 | B1 * | 7/2002 | Tanaka et al. ............. 385/100 |
| 6,424,455 | B1 | 7/2002 | Dmitri |
| 6,477,306 | B1 | 11/2002 | Kato et al. |
| 6,584,262 | B1 | 6/2003 | Pilipetskii et al. |
| 6,782,174 | B1 * | 8/2004 | Gleason et al. ............. 385/123 |
| 2001/0004415 | A1 | 6/2001 | Tanaka et al. ............. 385/123 |
| 2002/0048439 | A1 | 4/2002 | Tsukitani et al. |
| 2002/0181076 | A1 | 12/2002 | Bickham et al. |

FOREIGN PATENT DOCUMENTS

WO WO/02056069 7/2002

OTHER PUBLICATIONS

Masuda, et al., Ultra-wideband optical amplification with 3dB bandwidth of 65 nm using a gain-equalised two-stage erbium-doped fibre amplifier and Raman amplification, Electronics Letters, Apr. 24, 1997, vol. 33, No. 9.

Knudsen, et al., New Dispersion-Slope managed Fiber Pairs for Ultra Long Haul Transmission Systems, National Fiber Optic Engineers Conference, 2001 Technical Proceedings, pp. 1599-1607.

European Search Report Dated Mar. 15, 2005 from corresponding European Patent No. 04252553.5-2415.

* cited by examiner

*Primary Examiner*—Michelle Connelly-Cushwa
*Assistant Examiner*—Omar Rojas
(74) *Attorney, Agent, or Firm*—Grossman, Tucker, Perreault & Pfleger, PLLC

(57) ABSTRACT

An optical fiber cable includes pairs of transmission lines having length extensions and color coding to facilitate cable system assembly. Each transmission line is preferably constructed from unitary fibers including a P-type fiber and an N-type fiber with the length extensions of the same P-type and N-type fiber at each end respectively. The P-type fiber and the N-type fiber are preferably colored differently to indicate transmission direction. The P-type fiber and N-type fiber in one pair of transmission lines are preferably colored differently than the P-type fiber and N-type fiber in other pairs.

29 Claims, 13 Drawing Sheets

DEPLOYABLE OPTICAL FIBER TRANSMISSION LINES, OPTICAL TRANSMISSION CABLE, AND METHOD OF MAKING SAME

TECHNICAL FIELD

The present invention relates to optical fiber transmission lines and optical transmission cables and more particularly, to optical fiber transmission lines and cables employable in a wavelength division multiplexing (WDM) optical transmission system in which the desirable mean transmission characteristics across a transmission band in the optical fiber transmission lines of an optical cable as a whole can be optimized.

BACKGROUND INFORMATION

An optical communication system includes optical transmission cables for transmitting optical signals. An advanced commercial optical communication system utilizes numerous signal channels over a wide bandwidth in each optical fiber in a wavelength division multiplexed (WDM) transmission cable system to achieve high speed and high capacity optical signal transmission. Light propagating within an optical fiber, particularly in ultra long-haul WDM transmission cable systems, undergoes chromatic dispersion, which causes the light pulse to be delayed within the optical fiber, and optical nonlinear effects, which impair the transmission performance. Thus, the optical fiber transmission lines and cables used in such systems have been designed with different types of optical fibers in accordance with dispersion maps to compensate for dispersion and to mitigate the effects of fiber nonlinearities.

A typical WDM transmission cable system designed to a dispersion map comprises transmission cable spans and compensation cable spans. As used herein, "cable span" refers to the cable section between two repeaters, or between a transmitter and the repeater closest to the transmitter, or between a receiver and the repeater closest to the receiver. To satisfy the transmission performance requirements of a WDM transmission cable system, the optical transmission lines in each cable span preferably have desirable transmission characteristic, e.g., to manage the chromatic dispersion and loss across the transmission bandwidth over the span. The transmission lines should also be cost effective for deployment within the cable spans.

One example of an optical transmission cable is disclosed in U.S. Pat. No. 6,496,629, which is fully incorporated here in by reference. Referring to FIG. 1, this type of optical transmission cable 10 generally includes multiple optical fiber transmission lines 12 having optical fibers embedded in a thixotropic water blocking gel and extending through a tube 16 made of a polymeric material. First and second layers of ultra-high strength steel wires 18a, 18b extend along and around the tube 16 together with a polymeric water-blocking material. A copper sheath 20 surrounds the steel wires 18b and polyethylene insulation 22 surrounds the copper sheath 20. Referring to FIG. 2, the cable 10 is typically constructed from multiple pairs of optical fibers 24a, 24b. The pairs of optical fibers 24a, 24b become pairs of optical fiber transmission lines 12a, 12b in the cable 10. The optical fiber transmission lines 12a, 12b transmit optical signals in opposite transmission directions.

Examples of dispersion-managed optical fiber transmission lines and cables are disclosed in U.S. Pat. Nos. 5,894,537; 6,301,419; and 6,477,306 and U.S. Patent Application Publication Nos. 2002/0181076 and 2002/0048439, all of which are fully incorporated herein by reference. These dispersion-managed transmission lines typically combine sections of constituent optical fibers with different dispersion characteristics to manage dispersion and/or to suppress nonlinear optical effects. For example, a transmission line can include one or more positive dispersion constituent fibers (called P-type fibers) on the upstream transmission direction and one or more negative dispersion constituent fibers (called N-type fibers) on the downstream transmission direction.

There are several common problems associated with existing dispersion-managed transmission lines. Unpredictable trimming on both ends of the transmission lines during the cabling process often varies the total lengths of the P-type fibers and the N-type fibers. As a result, the chromatic dispersion properties of the transmission line may be altered.

Existing transmission lines also present problems when a length of transmission line needs to be removed and/or replaced to repair a fiber defect or a break in either a fiber or cable during cabling process or cable span assembly process. A repair with a replacement cable portion typically involves more than one splice, which complicates the cabling process and cable span assembly and usually increases the loss of the transmission line. If a repair occurs in an area with N-type fibers, in particular, the effect on the loss characteristics of the transmission line may be significant. The loss for each cable span should preferably be brought as close as possible to the repeater gain to achieve optimized performance across the transmission band in a WDM transmission cable system.

The optical fiber transmission lines and cables mentioned above also do not allow easy identification of fiber layout and transmission direction within a cable. If it is not easy to identify the fiber layout and transmission direction in a dispersion-managed transmission cable, system assembly, installation, and maintenance can be difficult, time-consuming, and not cost effective.

One optical transmission line and cable that has attempted to address one of these problems is disclosed in U.S. Pat. No. 6,421,484, which is fully incorporated herein by reference. This transmission line and cable attempt to maintain a desirable mean transmission characteristic as a whole regardless of the fluctuation in total length due to unpredictable trimming on the end portions. The main transmission line comprises one or more P-type fibers of a relatively larger mode field diameter and one or more N-type fibers of a smaller mode field diameter. Separate optical fibers having a chromatic dispersion equal to or less than the absolute value of the mean chromatic dispersion of the main transmission line are used as length extensions on both ends of the main transmission line to minimize the impact of the unpredictable length trimmings on the mean chromatic dispersion of the transmission line. The optical fibers for the length extensions also have their mode field diameters selected to optimize the fusion splices to the main transmission line and the repeater tail.

The transmission line and cable disclosed in U.S. Pat. No. 6,421,484 suffers from some drawbacks. Providing length extensions using optical fiber types different from those in the main transmission line degrades system performance and complicates the assembly process. In particular, the use of different fiber types to provide length extensions involves extra steps during cable production (e.g., extra fusion splices) and requires extra cable types for system maintenance and repair. The added length also may not be able to compensate for the deterioration in transmission characteristics, such as chromatic dispersion, due to the removal of fiber or cable during the cabling process and cable span assembly process without inserting replacement fibers or cables. The hundreds of meters of length extension in front of the optical fibers of positive dispersion and larger mode field diameter may cumulatively impact the efficiency of nonlinearity suppression due to the smaller mode field diameter of the fibers used for the length extension, especially in an ultra long haul and ultra high capacity system.

The length extensions with different fiber types also make it more difficult to inspect the main transmission line during the cabling process. Furthermore, even though these length extensions introduce only a fraction of cumulative dispersion in their corresponding spans, in aggregate they might cause significant cumulative dispersion and dispersion slope in an ultra long haul system with hundreds of spans. Such cumulative dispersion and dispersion slope may be difficult to compensate simultaneously.

U.S. Pat. No. 6,421,484 also discloses that the main transmission line is color coded uniformly together with the length extension on the negative dispersion fiber end and the length extension at the positive dispersion end is color coded with a different color to indicate the transmission direction. This color scheme has disadvantages. Because each transmission line is color coded uniformly, the cable including these transmission lines loses its symmetry and must be marked to indicate orientation. This color scheme is also not cost effective for the repair of an installed system.

Accordingly, there is a need for a transmission line and optical cable, and a method of making a transmission line and cable, that address the problems discussed above.

SUMMARY

In accordance with one aspect of the present invention, an optical cable comprises at least one first direction transmission line for transmitting an optical signal in a first direction along the cable and at least one second direction transmission line for transmitting an optical signal in a second direction along the cable. The first and second direction transmission lines are each made from first and second types of unitary fiber. Each unitary fiber has a main transmission section plus a leading length extension and a trailing length extension on either end of the main transmission section. The main transmission section includes a combination of P-type fibers and N-type fibers arranged according to transmission direction. The leading length extension is formed by a section of fiber extending continuously from a first fiber in the main transmission section and the trailing length extension is formed by a section of fiber extending continuously from the last fiber in the main transmission section. The leading length extensions in the first direction transmission line and the second direction transmission line have substantially the same length. The trailing length extensions in the first direction transmission line and the second direction transmission line have substantially the same length.

In a preferred embodiment, the leading length extension of the first type of unitary fiber is formed by a section of P-type fiber extending continuously from the main transmission section. The trailing length extension of the first type of unitary fiber is formed by a section of N-type fiber extending continuously from the main transmission section. The leading length extension of the second type of unitary fiber is formed by a section of N-type fiber extending continuously from the main transmission section. The trailing length extension of the second type of unitary fiber is formed by a section of P-type fiber extending continuously from the main transmission section.

In accordance with another aspect of the present invention, an optical cable comprises a plurality of pairs of transmission lines. Each of the pairs of transmission lines including a first direction transmission line for transmitting an optical signal in a first direction along the cable and a second direction transmission line for transmitting an optical signal in a second direction along the cable. Each of the transmission lines in a pair includes a unitary fiber having P-type fiber of a first color and N-type fiber of a second color. Each of the pairs of transmission lines uses unique pairs of colors for the P-type fiber and the N-type fiber.

In accordance with another aspect of the present invention, a process is provided for making an optical cable. The process comprises providing first and second types of unitary fiber. Each of the first and second types of unitary fiber has a main transmission section and a leading length extension and a trailing length extension on either end of the main transmission section. The main transmission section includes a combination of P-type fibers and N-type fibers. The leading length extension is formed by a section of fiber extending continuously from a first fiber in the main transmission section and the trailing length extension is formed by a section of fiber extending continuously from a last fiber in the main transmission section. The process also comprises arranging the first and second types of unitary fiber to form at least one pair of transmission lines, wherein the leading length extensions and the trailing length extensions of the first and second unitary fibers are arranged together. The process further comprises trimming at least a portion of the pair of transmission lines such that desired transmission characteristics are substantially maintained.

In accordance with a further aspect of the present invention, a process is provided for making a unitary fiber from P-type and N-type fiber, for use in a transmission line. The process comprises determining fiber lengths of leading and trailing length extensions of the P-type fiber and the N-type fiber based on statistical cable production data, determining fiber lengths of the P-type fibers in a main transmission section of the unitary fiber based on requirements of the transmission line and fiber transmission properties, and determining fiber lengths of the N-type fibers in the main transmission section of the unitary fiber based on requirements of the transmission line and fiber transmission properties. The lengths of first and last fibers in the unitary fiber are then determined by adding the lengths of the leading and trailing extensions, respectively, to the lengths of first and last fibers in the main transmission section, respectively. The process further comprises splicing the P-type fibers and the N-type fibers to form the unitary fiber with the first and last fibers at ends of the unitary fiber.

In accordance with another aspect of the present invention, a process is provided for making a unitary fiber from P-type fiber and N-type fiber, for use in a transmission line. The process comprises the steps of determining lengths of the leading and trailing length extensions based on statistical cable production data and determining transmission requirements of the unitary fiber based on requirements of the transmission line, the leading and trailing length extensions, and fiber transmission properties. The lengths of the P-type fibers and the N-type fibers in the unitary fiber are then determined based on the transmission requirements of the unitary fiber, a fiber configuration in the transmission line, and the fiber transmission properties. The P-type fibers and the N-type fibers are arranged according to the fiber configuration and are spliced to form the unitary fiber in which first and last constituent fibers in the unitary fiber include the length extensions.

In accordance with yet another aspect of the present invention, an optical transmission line comprises a main transmission section including a combination of P-type fibers and N-type fibers. The P-type fibers have a first color and the N-type fibers have a second color. The transmission line further comprises a leading length extension on one end of the main transmission section formed by a continuous fiber extending from the main transmission section and a trailing length extension on the other end of the main transmission section formed by a continuous fiber extending from the main transmission section.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

The manufacture of deployable transmission lines and optical transmission cable spans is described in greater detail below. The process described can be used to manufacture any dispersion-managed transmission lines in which the desirable mean transmission characteristics (e.g., chromatic dispersion and loss) need to be maintained across the transmission band. The exemplary process is for manufacturing a deployable dispersion-managed transmission line including one or more P-type fibers on the upstream transmission direction and one or more N-type fibers on the downstream transmission direction. Although exemplary dispersion-managed transmission lines and cables are described herein, the concepts of the present invention can also be used with other types of transmission lines and cables.

Figure 1:
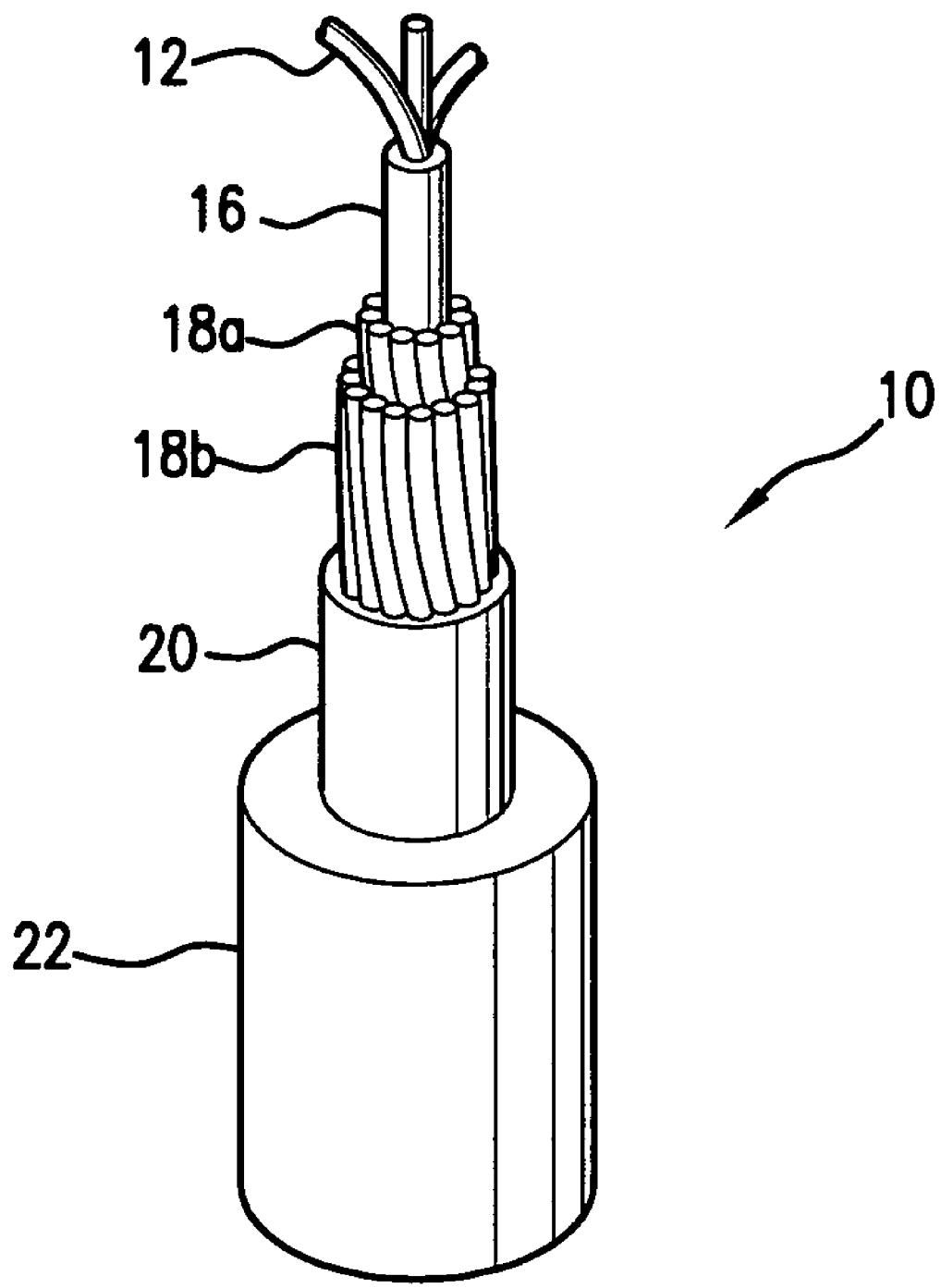
FIG. 1 is a perspective view of an optical fiber cable.
Figure 2:
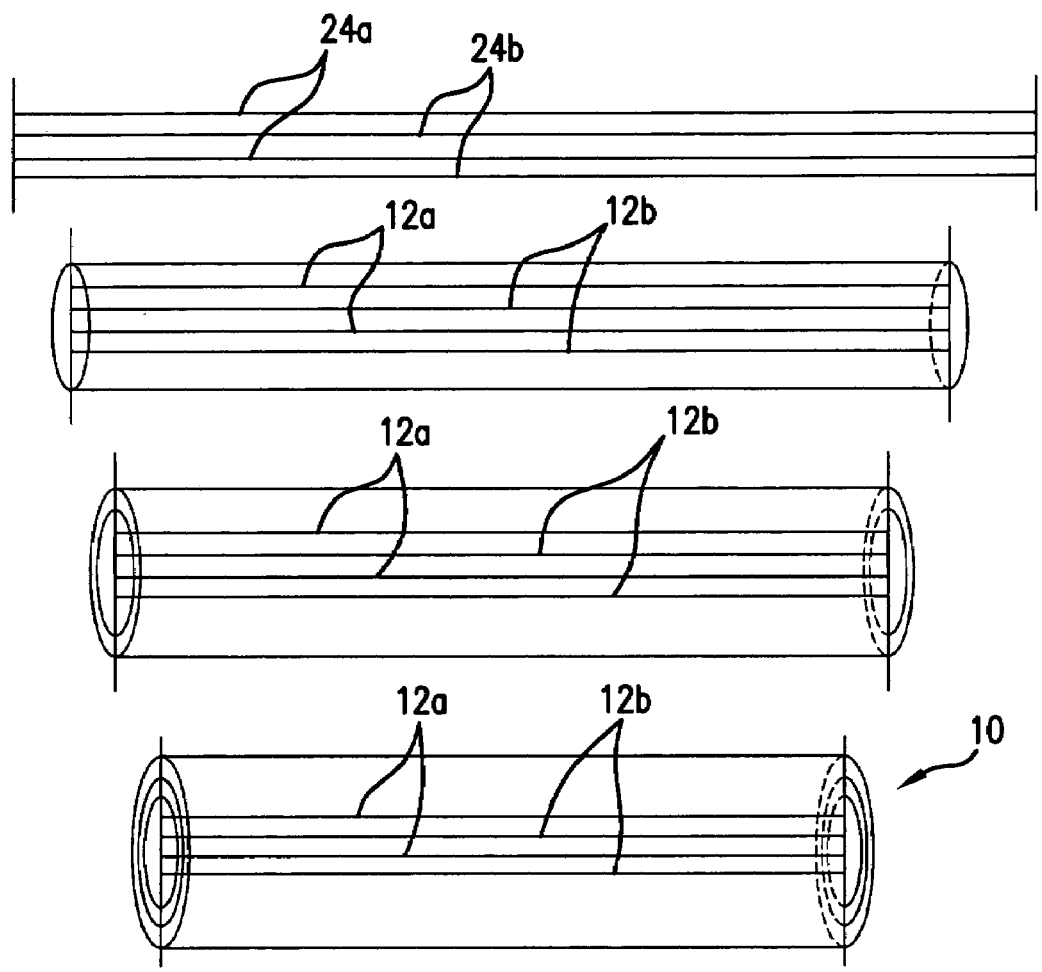
FIG. 2 schematically illustrates a process of making an optical fiber cable.
Figure 3:
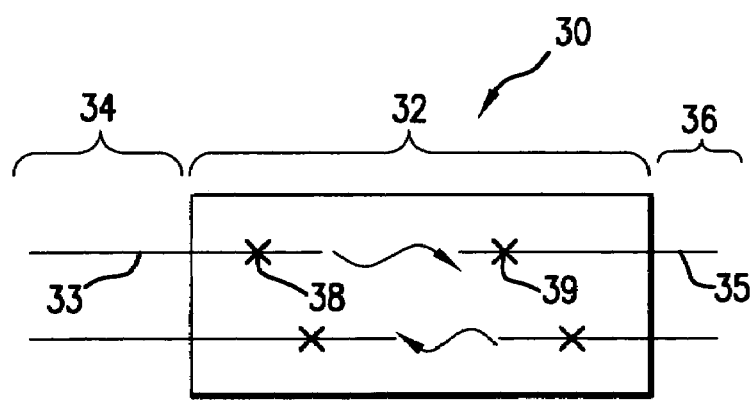
FIG. 3 is a schematic illustration of a unitary fiber pair, according to one embodiment of the present invention.
Figure 4:
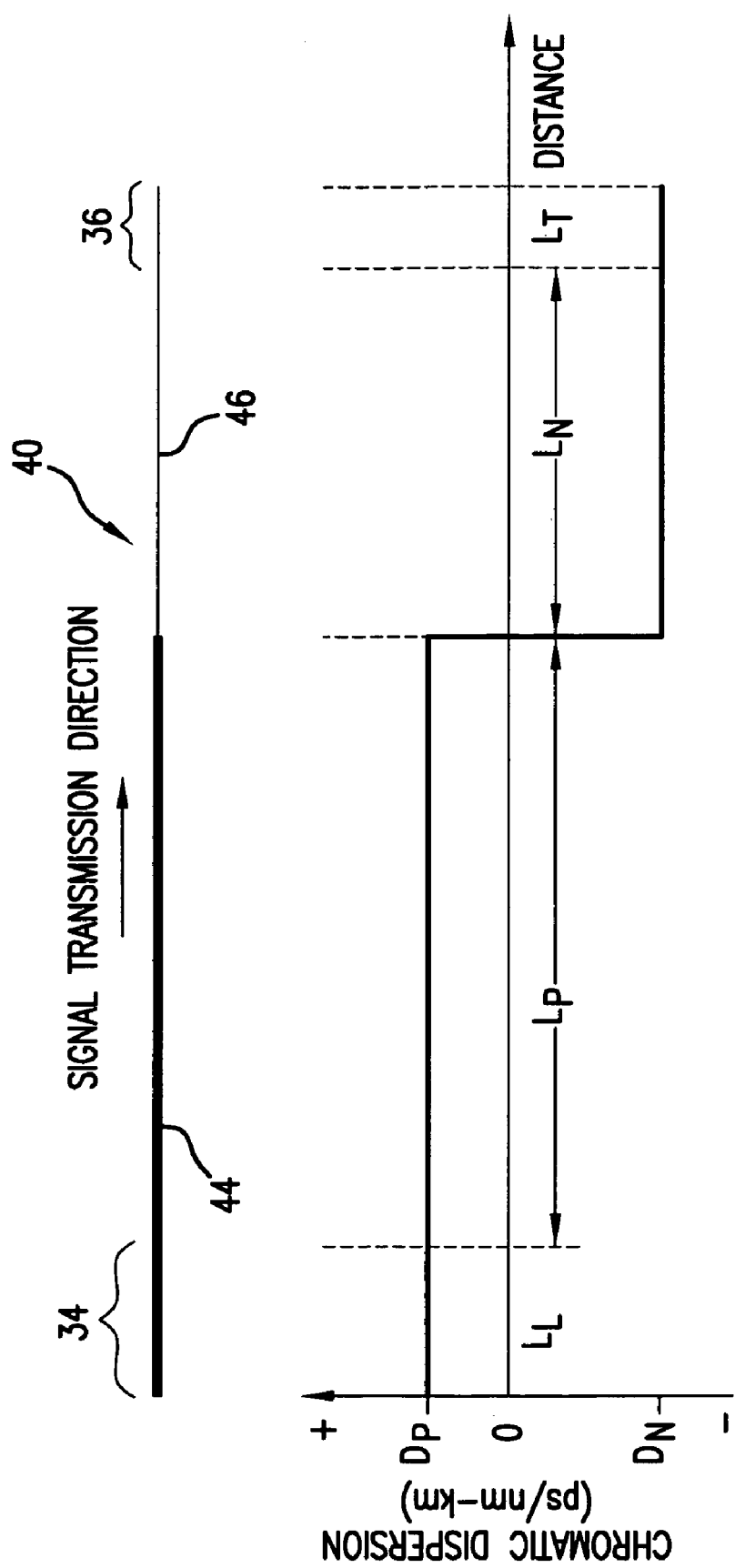
FIG. 4 is a schematic illustration of the chromatic dispersion in a first direction transmission line, according to one embodiment of the present invention.
Figure 5:
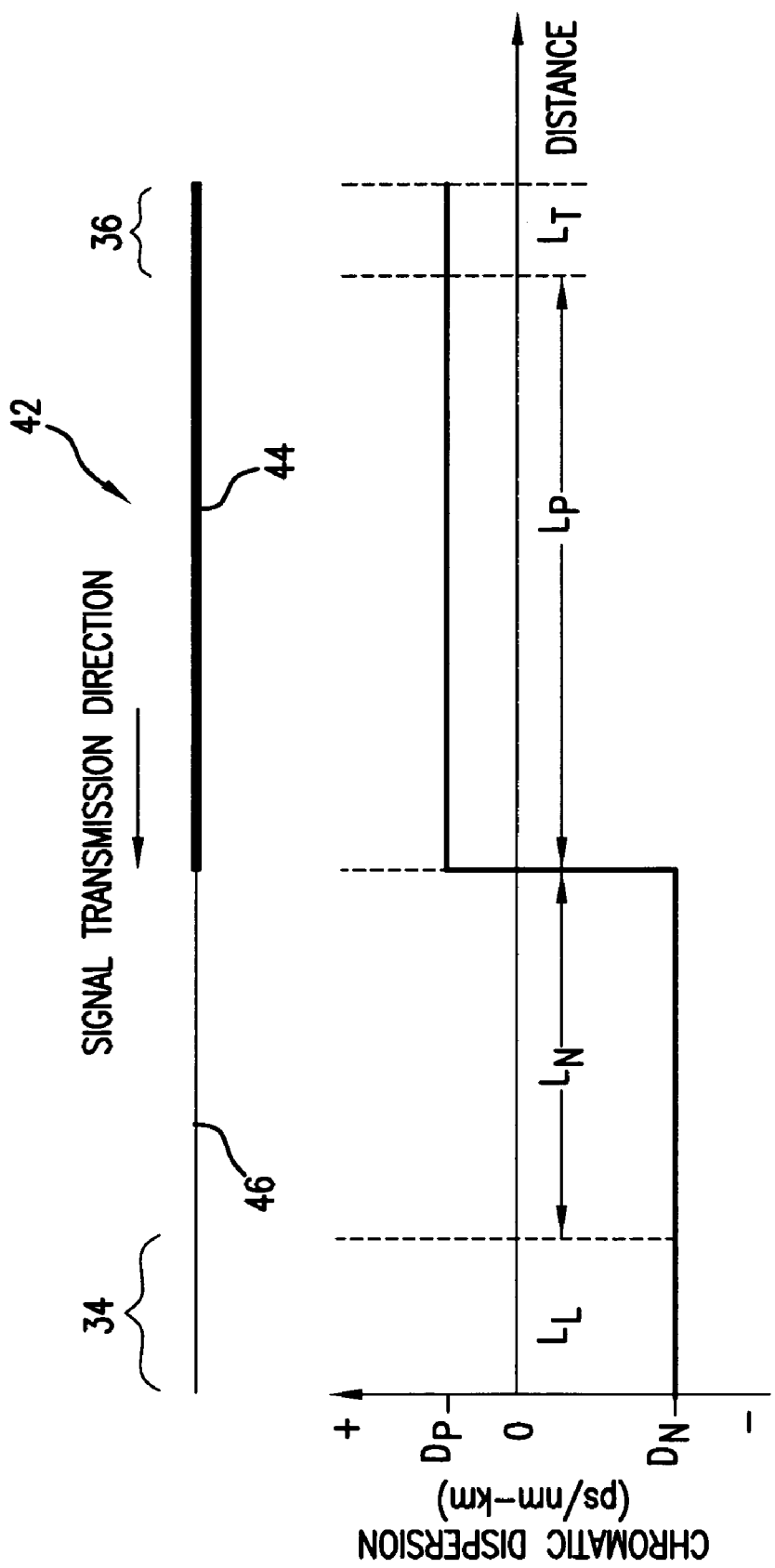
FIG. 5 is a schematic illustration of the chromatic dispersion in a second direction transmission line, according to one embodiment of the present invention.
Figure 6:
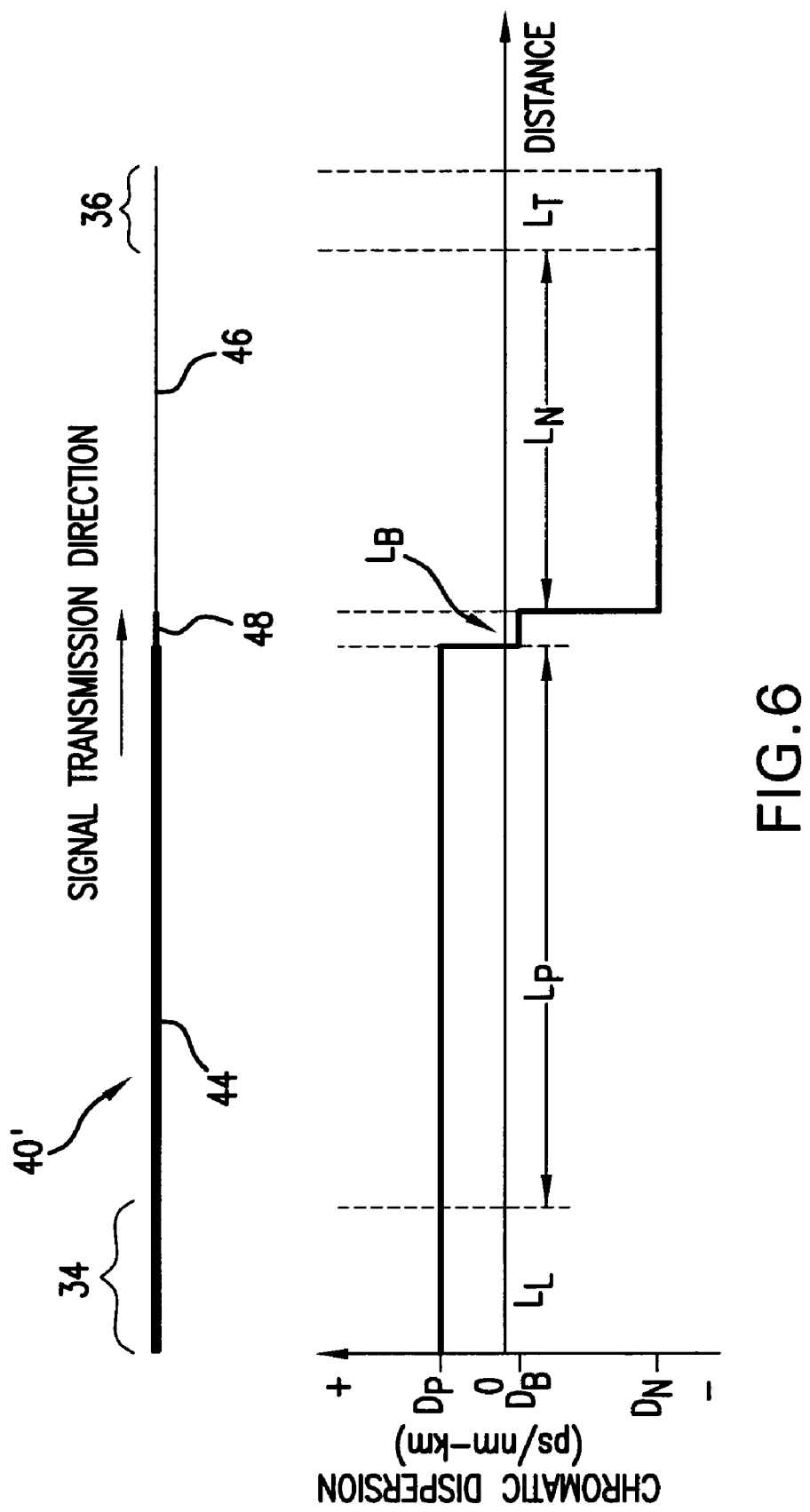
FIG. 6 is a schematic illustration of the chromatic dispersion in a first direction transmission line including a bridge fiber, according to another embodiment of the present invention.
Figure 7:
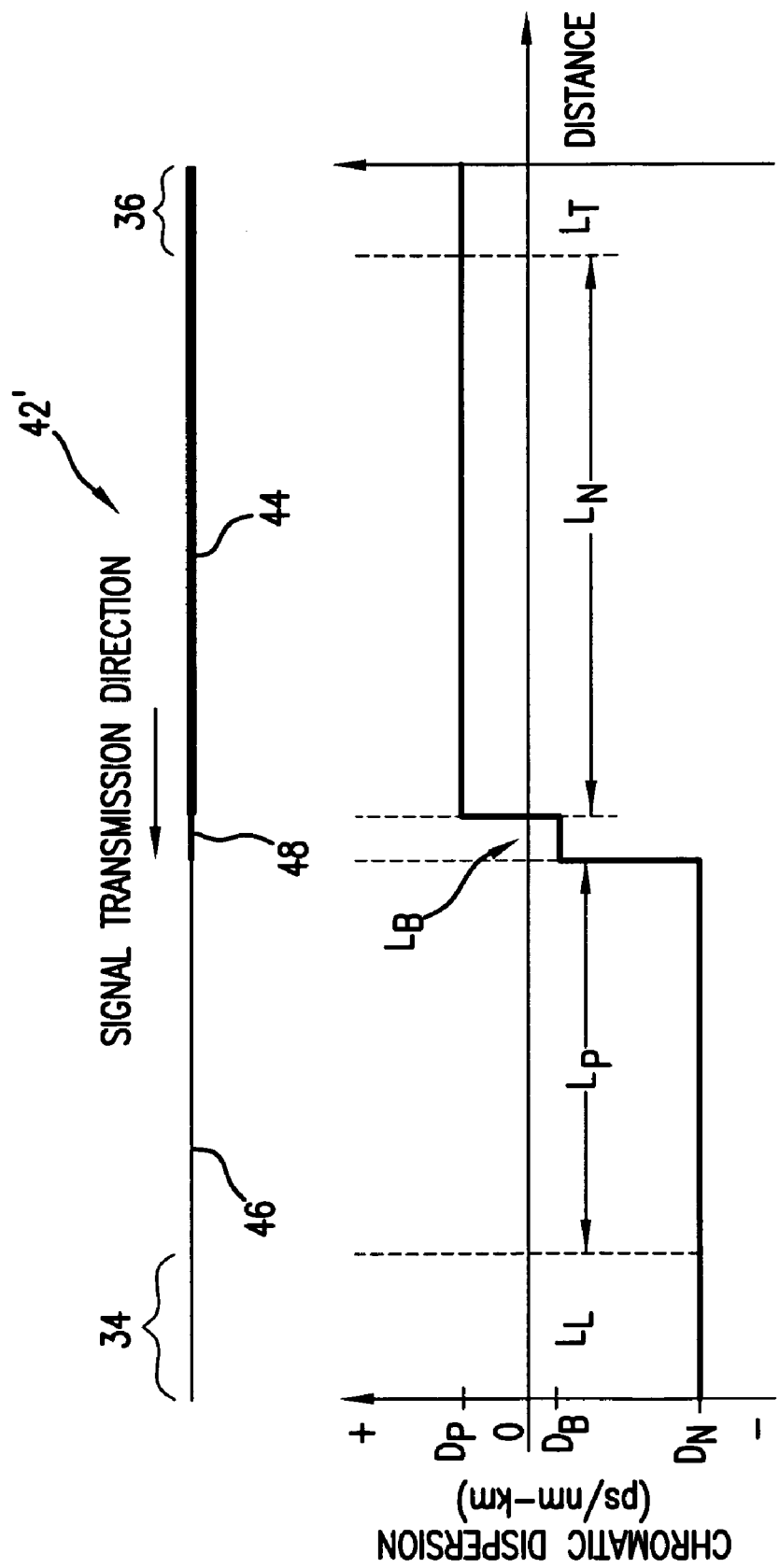
FIG. 7 is a schematic illustration of the chromatic dispersion in a second direction transmission line including a bridge fiber, according to another embodiment of the present invention.

Referring to FIG. 3, first and second direction transmission lines are formed from a unitary fiber pair 30. Each unitary fiber in a unitary fiber pair 30 includes a main transmission section 32 plus a leading length extension 34 and a trailing length extension 36. The main transmission section 32 of each fiber preferably comprises a combination of one or more P-type fibers and one or more N-type fibers (i.e., constituent fibers) arranged according to the transmission direction. The P-type fibers can be spliced to the N-type fibers directly or with bridge fibers. In the pair 30, the main transmission sections 32 of both unitary fibers preferably have substantially the same transmission characteristics, fiber type configuration and color scheme (described in greater detail below) along their transmission directions. The length extensions 34, 36 are preferably formed by the same continuous fiber 33, 35, respectively, extending continuously from the first and last constituent fibers in the main transmission section 32, respectively. The continuous fibers 33, 35 are spliced to the other fiber(s) of the main transmission section 32 at splices 38, 39. The leading length extensions 34 in the unitary fiber pair 30 preferably have the same length and the trailing length extensions 36 in the unitary fiber pair 30 preferably have the same length. In the unitary fiber pair 30, the fiber type of a leading length extension 34 in the unitary fiber for one direction is the same as that of the trailing length extension 36 in the unitary fiber for the other direction.

Referring to FIGS. 4–7, exemplary embodiments of unitary fibers 40, 42 are described in greater detail. The unitary fibers 40, 42 are constructed from one or more P-type fibers 44 and one or more N-type fibers 46 in a fiber layout configuration based on the targeted dispersion-managed transmission lines. First and second types of unitary fibers 40, 42 are constructed for transmission of optical signals in first and second directions. In an exemplary cable, a Type I unitary fiber 40 accounts for signal transmission in one direction to provide a first direction transmission line and a Type II unitary fiber accounts for signal transmission in the opposite direction to provide a second direction transmission line. Thus, the Type I and Type II unitary fibers 40, 42 are laid along the same direction in the cable but have opposite transmission directions.

The unitary fibers 40, 42 are preferably wound on shipping bobbins in a manner to facilitate matching the Type I and Type II fibers 40, 42 to form the pair of first and second direction transmission lines. The Type I unitary fiber 40 has its P-type fibers 44 wound on the outside and its N-type fibers 46 wound on the inside of the shipping bobbin. The Type II unitary fiber 42 has its N-type fibers 46 wound on the outside and its P-type fibers 44 wound on the inside of the shipping bobbin. Thus, the P-type fiber 44 is at the leading end of the Type I fiber 40, whereas the N-type fiber 46 is at the leading end of the Type II fiber 42.

In the exemplary embodiment, the mean dispersion characteristics of a transmission line made from a unitary fiber 40, 42 are determined by the length ratio of the P-type fibers 44 to N-type fibers 46 in the transmission line and the transmission properties of the P-type and N-type fibers. The P-type fibers 44 and N-type fibers 46 preferably have a closely matched relative dispersion slope, e.g., RDS (defined as the ratio of the fiber dispersion slope across a transmission band over its chromatic dispersion at the center wavelength of the transmission band). This property makes it possible to manage the dispersion characteristic of a transmission line across a transmission band. Both P-type fibers 44 and N-type fibers 46 preferably have a relatively larger mode field diameter and a high absolute value of chromatic dispersion to suppress the effects of fiber optical nonlinearities. The ratio between the temperature coefficients of the chromatic dispersions of the P-type fibers 44 and the N-type fibers 46 is preferably closely matched to that between the chromatic dispersions of both P-type fibers 44 and the N-type fibers 46. Thus, the chromatic dispersion of a transmission line as a whole has an optimized temperature performance and the chromatic dispersion of a system comprised of such transmission lines as a whole is much less susceptible to temperature change.

In the exemplary embodiment, each unitary fiber 40, 42 has one or more P-type fibers 44 fusion-spliced together, either directly (FIGS. 4 and 5) or indirectly with a short bridge fiber 48 (FIGS. 6 and 7), with one or more N-type fibers 46. The short bridge fiber 48 is used to optimize the loss characteristics of the connection between P-type fiber 44 and N-type fiber 46. Any fiber suitable for single mode operation can be used for the bridge fiber 48, as long as the length of the bridge fiber 48 and its cutoff wavelength measured under the deployment environment (in cable, for example) together with the mode couplings introduced in the splices between the bridge fiber 48 and either the P-type fiber 44 at one end of the bridge fiber 48 or the N-type fiber 46 at the other end of the bridge fiber 48 preferably minimize adverse affects on transmission system performance. The bridge fiber 48 preferably has an absolute value of cumulative dispersion and loss low enough to have a negligible impact on the transmission characteristics of the unitary fiber 40', 42' as a whole. In one example, the bridge fiber 48 is a large mode field diameter dispersion-shifted fiber of length more than about 20 m but less than about 25 m and has a cutoff wavelength measured in its straight configuration no longer than the minimum transmission wavelength. The total loss of the splices between the bridge fiber 48 and P-type fiber 44 or N-type fiber 46 is preferably less than about 0.7 dB.

The Type I unitary fiber 40 preferably has an overall length of P-type fibers 44 corresponding to the length $L_P$ of the P-type fibers 44 in a targeted first direction transmission line plus a length $L_L$ of the leading end length extension 34 of P-type fiber 44. The Type I unitary fiber also has an overall length of N-type fibers 46 corresponding to the length $L_N$ of the N-type fibers in the targeted first direction transmission line plus a length $L_T$ of the trailing end length extension 36 of N-type fiber 46. The Type II unitary fiber 42 preferably has an overall length of P-type fibers 44 corresponding to the length $L_P$ of the P-type fibers 44 in a targeted second direction transmission line plus a length $L_T$ of the trailing end length extension 36 of P-type fiber 44. The Type II unitary fiber also has an overall length of N-type fiber 46 corresponding to the length $L_N$ of the N-type fibers 46 in the targeted transmission line plus a length $L_L$ of the leading end length extension 34 of N-type fiber 46. The leading length extensions 34 of the P-type fiber 44 of the Type I unitary fiber 40 and the leading length extension 34 of the N-type fiber 46 of the Type II unitary fiber 42 preferably have substantially the same length $L_L$. The trailing length extension 36 of the N-type fiber 46 of the Type I unitary fiber 40 and the trailing length extension 36 of the P-type fiber 44 of the Type II unitary fiber 42 preferably have substantially the same length $L_T$.

The overall lengths of the P-type fibers and the N-type fibers (i.e., the constituent fibers) in each type unitary fiber are based on the requirements of corresponding targeted transmission line, the fiber transmission properties, and the length extensions on both ends. The length extensions 34, 36 are preferably determined based on statistical cable production information, such as, the amount of cable that is typically removed during the cabling process. After the length extensions 34, 36 are determined, the lengths of the P-type fibers and the N-type fibers in a unitary fiber are determined.

According to one method, the lengths of the P-type fibers and the N-type fibers in the corresponding targeted transmission line are first determined based on the requirements of the targeted transmission line and fiber transmission properties. The lengths of the first and last constituent fibers in the unitary fiber are then determined by adding the length of the respective extensions to the lengths of the P-type fibers and the N-type fibers in the corresponding targeted transmission line.

According to another method, the transmission requirements of a unitary fiber are first determined based on the requirements of the corresponding targeted transmission line, the length extensions on both ends, and the fiber transmission properties. According to a fiber layout configuration similar to the corresponding targeted transmission line, the lengths of the P-type fibers and the N-type fibers (i.e., the constituent fibers) in a unitary fiber are then determined based on the transmission requirements of the unitary fiber.

Once the lengths of the P-type fibers and the N-type fibers are determined, the N-type and P-type fibers are arranged according to the desired configuration and spliced. The fibers can be spliced using techniques known to those of ordinary skill in the art.

The length extensions on both ends allow cable to be trimmed or removed during the cabling process while maintaining the transmission characteristics of the targeted transmission line. The P-type fibers and N-type fibers used in the length extensions of each unitary fiber 40, 42 preferably have transmission properties, such as dispersion and dispersion slope, the same as or close to the nominal value of their corresponding fiber types to further minimize the impacts from the unpredictable trimmings or cable removal in repairs.

Figure 8:
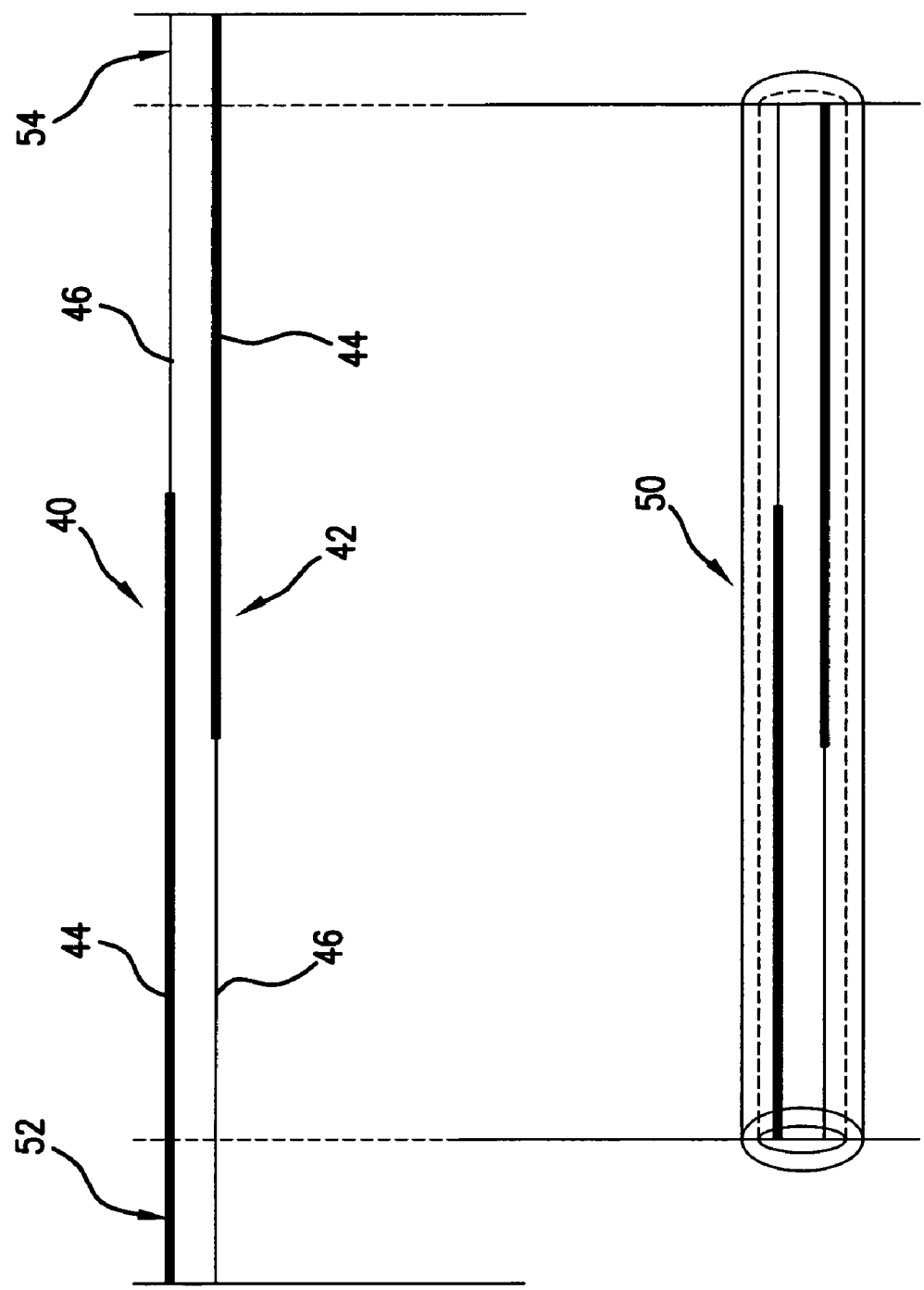
FIG. 8 illustrates a length trimming process using the optical fiber cable, according to one embodiment of the present invention.

Referring to FIG. 8, the length extensions enable unpredictable length trimmings on both ends 52, 54 of a cable 50 during the cabling process. Before being integrated into a system, the residual length extensions in the cable 50 including the fibers 40, 42 can be trimmed to have the desired positive dispersion fiber length and negative dispersion fiber length in each unitary fiber 40, 42. The length extensions can be trimmed according to the precise targeted end transmission line, for example, if strict requirements on the individual transmission line span are applied. The length extensions can also remain on the cable 50 if the loss of their unitary fiber is under the span loss limit and the resulting deviations in cumulative dispersion and dispersion slope can be compensated somewhere in the system by the adjustment in one or more compensation line cable spans (i.e., where simultaneous compensation of dispersion and dispersion slope is needed). Before the adjustment in the compensation cable spans, the cumulative dispersions on both opposite directions can be balanced by cable trimming on one end or cable adding on another end in one or two end transmission line spans.

Figure 9:
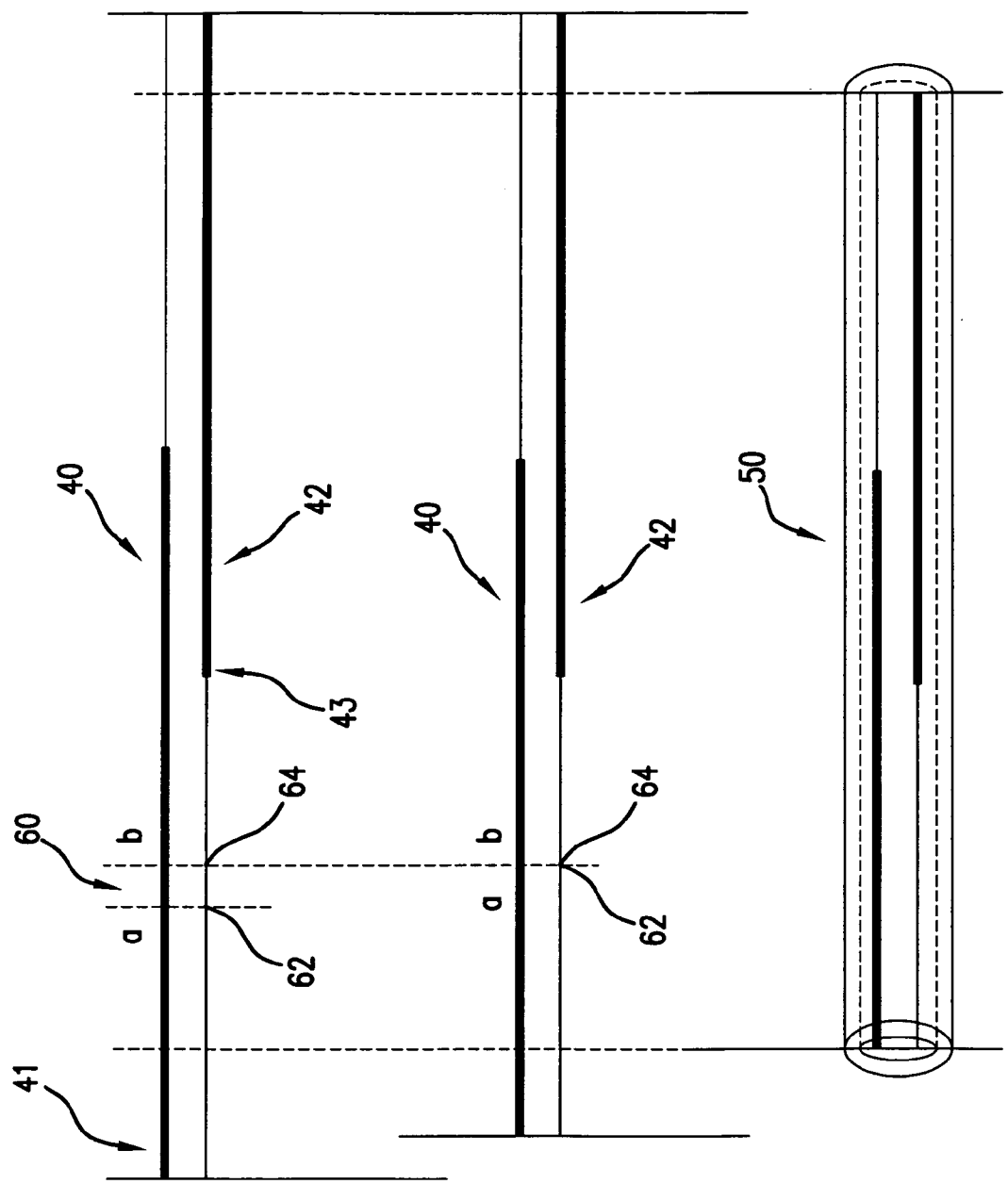
FIG. 9 illustrates a cable removal process using the optical fiber cable, according to one embodiment of the present invention.

Referring to FIG. 9, the length extensions can also compensate for a short fiber length or cable length removal due to a fiber or cable break. When a break occurs in a region 60 between an end 41 of the fibers 40, 42 and the transition 43 to all P-type fibers and the length of fiber or cable removed is less than the respective length extension at that end 41, the ends 62, 64 around the break region 60 can be joined together without the insertion of a replacement. If the length of fiber or cable being removed is longer than the respective length extension, a repair fiber pair or cable with the same configuration as the length extension can be added to the end of the unitary fiber.

Figure 10:
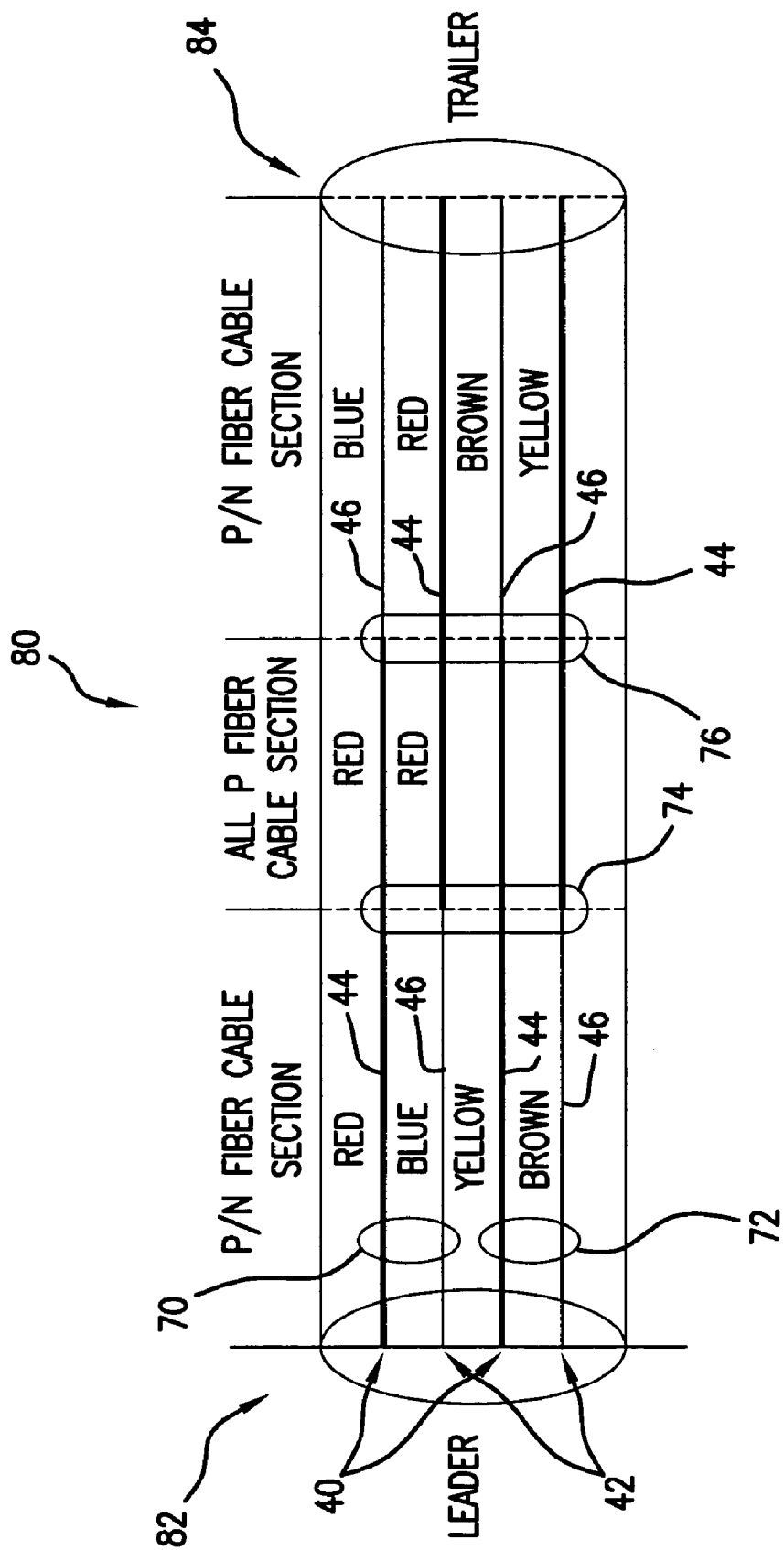
FIG. 10 is a schematic diagram of an optical fiber cable including color-coded transmission lines, according to one embodiment of the present invention.

Referring to FIG. 10, the Type I and Type II unitary fibers 40, 42 form multiple pairs 70, 72 of transmission lines in a cable span 80. In each pair 70, 72, one transmission line (unitary fiber 40) provides transmission in one direction and the other transmission line (unitary fiber 42) provides transmission in the other direction. The ratio of the length of all P-type fibers 44 to the length of all N-type fibers 46 in the transmission line can be varied to accommodate the variation of related properties in each type of fiber. The splices between the P-type fiber 44 and the N-type fiber 46 are preferably located within a defined range to reduce the possibility of a break occurring in the splice regions 74, 76, either during the cabling process or in a deployed system, which is more difficult and costly to repair.

According to one preferred embodiment, the unitary fibers 40, 42 are color coded to provide identification of fiber layout and indication of transmission direction when used in the cable span 80. In each pair 70, 72 of unitary fibers 40, 42 (or transmission lines), the P-type fibers 44 are all color coded uniformly with a first color and the N-type fibers 46 are all color coded uniformly with a different second color. Each pair 70, 72 is also assigned its own pair of colors. For example, one pair 70 of unitary fibers 40, 42 (or transmission lines) includes Red P-type fiber 44 and Blue N-type fiber 46, and another pair 72 of unitary fibers 40, 42 (or transmission lines) includes Yellow P-type fiber 44 and Brown N-type fiber 46. In a cable span 80 of M transmission lines, M different colors are used to distinguish each of the transmission lines at each end. The bridge fibers 48, when used, are preferably not color coded. The color pattern from one end 82 of the cable span 80 is the same as that from the other end 84 to provide a symmetric cable span. The cable can also be footage marked by distance. The P-type fibers 44 and the N-type fibers 46 are preferably colored before they are spliced.

By identifying the fiber layout and indicating the transmission direction, the color coding assists repair and system integration. Because the transmission characteristics, fiber layout and color layout of both transmission lines in each pair 70, 72 are substantially identical along the respective transmission directions of the cable span 80, the cable is symmetric and there is no need to mark the transmission direction. Thus, factory cable repair and system integration, installation, and maintenance are made much easier.

Figure 11:
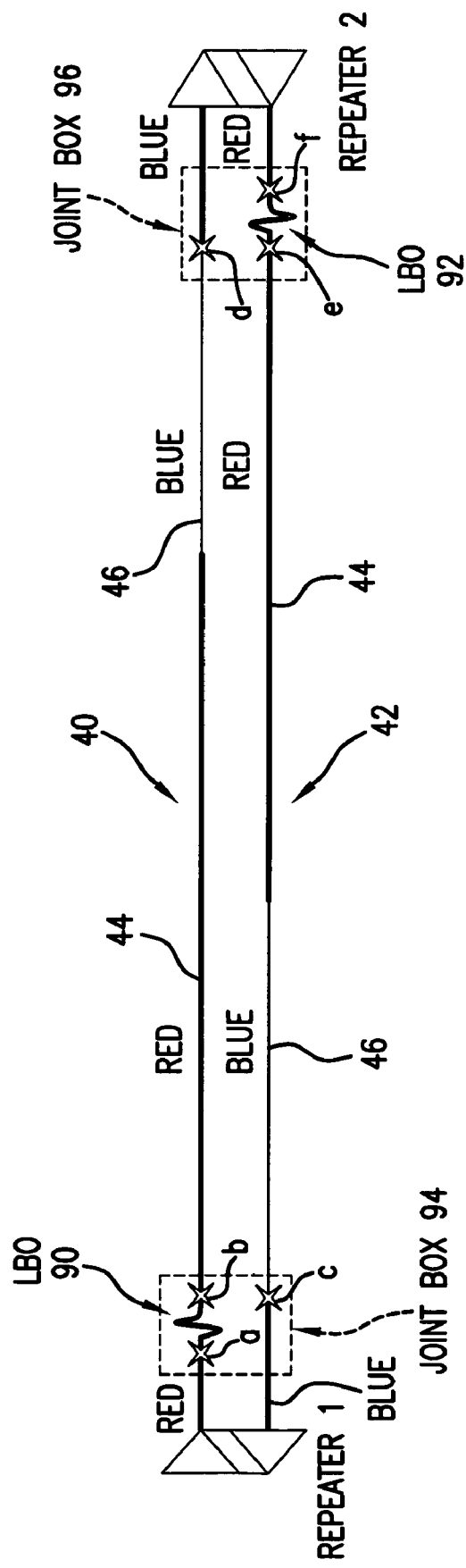
FIG. 11 is a schematic illustration of a pair of transmission lines in cable span including loss build outs (LBO), according to one embodiment of the present invention.

Referring to FIG. 11, a loss build out (LBO) unit 90, 92 can be added in each transmission line for span loss management, if needed, after the cable is trimmed during the cabling process. The length of a targeted transmission line is preferably preset to maximize its loss to the span loss limit from system requirements. This span loss limit together with the nominal value of the contributions from the length extensions sets the loss upper limit for a unitary fiber 40, 42. When the loss from the length extensions is removed, the loss deviation is preferably corrected to maintain the preferred loss characteristics. To help suppress the effects of fiber optical nonlinearities, the LBO unit 90, 92 is preferably added on the input end of each transmission line (e.g., on the P-type fiber end closest to the repeater output where optical power is high) together with the integration splice in a coupling or joint box 94, 96. The LBO unit 90, 92 preferably has a preset value selected to bring the span loss to the desirable value. The LBO unit 90, 92 is preferably built up with a short piece of dispersion shifted fiber.

One example of a slope-matched fiber cable including deployable transmission lines manufactured according to the above process is described in greater detail below. The transmission lines in this example manage dispersion and dispersion slope simultaneously. The slope-matched fiber cable can be used in an ultra high capacity and ultra long haul WDM transmission cable system, as well as in a relatively lower capacity and medium reach WDM transmission.

The exemplary P-type fiber has a nominal chromatic dispersion of about 20 ps/nm-km at a wavelength of 1550 nm and a dispersion slope of about 0.06 ps/nm$^2$-km across a transmission band from 1530 nm to 1565 nm. This gives a nominal RDS value of about 0.003/nm. The exemplary P-type fiber also has a super large mode field diameter to give a nominal effective area of about 110 μm$^2$ at a wavelength of 1550 nm. The exemplary P-type fiber has a temperature coefficient of its chromatic dispersion at 1550 nm of about −0.0016 ps/nm-km-° C.

The exemplary N-type fiber has a nominal chromatic dispersion of about −40 ps/nm-km at a wavelength of 1550 nm and a dispersion slope of about −0.12 ps/nm$^2$-km across a transmission band from 1530 nm to 1565 nm to give a nominal RDS value of about 0.003/nm. The exemplary N-type fiber also has a mode field diameter larger than most of the dispersion compensating fibers to give a nominal effective area of about 30 μm$^2$. The exemplary N-type fiber also has a temperature coefficient of its chromatic dispersion of about 0.0047 ps/nm-km-° C.

Because the RDS values for both the P-type and N-type fibers are substantially equal, the end-to-end cumulative chromatic dispersion in each signal transmission path in the system utilizing the exemplary slope-matched fiber cables can be fully compensated across the transmission band. Because the ratio between the temperature coefficients of the chromatic dispersions of P-type fibers and N-type fibers is very closely matched to that between the chromatic dispersions of both P-type and N-type fibers, the fully compensated end-to-end cumulative chromatic dispersion across the transmission band is not sensitive to temperature change.

In this example, the P-type fibers and the N-type fibers described above are spliced together using a bridge fiber to form the Type I and Type II unitary fibers. The total length of each exemplary unitary fiber is about 47 km and includes about 1.7 km for the leading length extensions and about 0.7 km for the trailing length extensions. To meet the chromatic dispersion requirement of a targeted slope-matched fiber cable span, the Type I unitary fiber used to manufacture this type of slope-matched fiber cable is designed to have a mean chromatic dispersion of about −3.2 ps/nm-km at a wavelength of 1550 nm and the Type II unitary fiber is designed to have a chromatic dispersion of about −4.5 ps/nm-km at a wavelength of 1550 nm. Both the Type I and Type II fibers preferably have their nominal RDS values substantially the same as the P-type fiber and the N-type fiber (i.e., about 0.003/nm).

According to this example, the slope-matched fiber cable is constructed with a span length of about 44.6 km, a mean chromatic dispersion of about −3.5 ps/nm-km, and a dispersion slope of about −0.0105 ps/nm²-km at a wavelength of 1550 nm. The nominal RDS values of the slope-matched fiber cable span as a whole is the same as the P-type fiber, the N-type fiber and the unitary fibers (i.e., 0.003/nm). The temperature coefficient of the chromatic dispersion at 1550 nm of each transmission line in the slope-matched fiber cable span as a whole is about 0.0009 ps/nm-km-° C.

The exemplary fibers also meet the span loss requirements. In the preferred embodiment where the leading length extension is longer than the trailing length extension, the loss upper limit for the Type I unitary fibers 40 is higher than that of the Type II unitary fibers 42. A dispersion shifted fiber of a large effective area can be used in each unitary fiber as the bridge fiber 48 (see FIGS. 6 and 7) to optimize the splicing loss performance between the P-type fibers 44 and the N-type fibers 46.

The exemplary slope-matched fiber cable span includes sixteen (16) or eight (8) pairs of the transmission lines with the above transmission characteristics. In this example, the eight (8) splices between the P-type fibers and the N-type fibers in the transmission lines transmitting in each direction are restricted in an area or splice region having a range of less than about 0.4 km. The center of this area may vary from cable to cable. Sixteen different colors are used for color coding the fibers and the bridge fibers are not color coded in this example.

Figure 12:
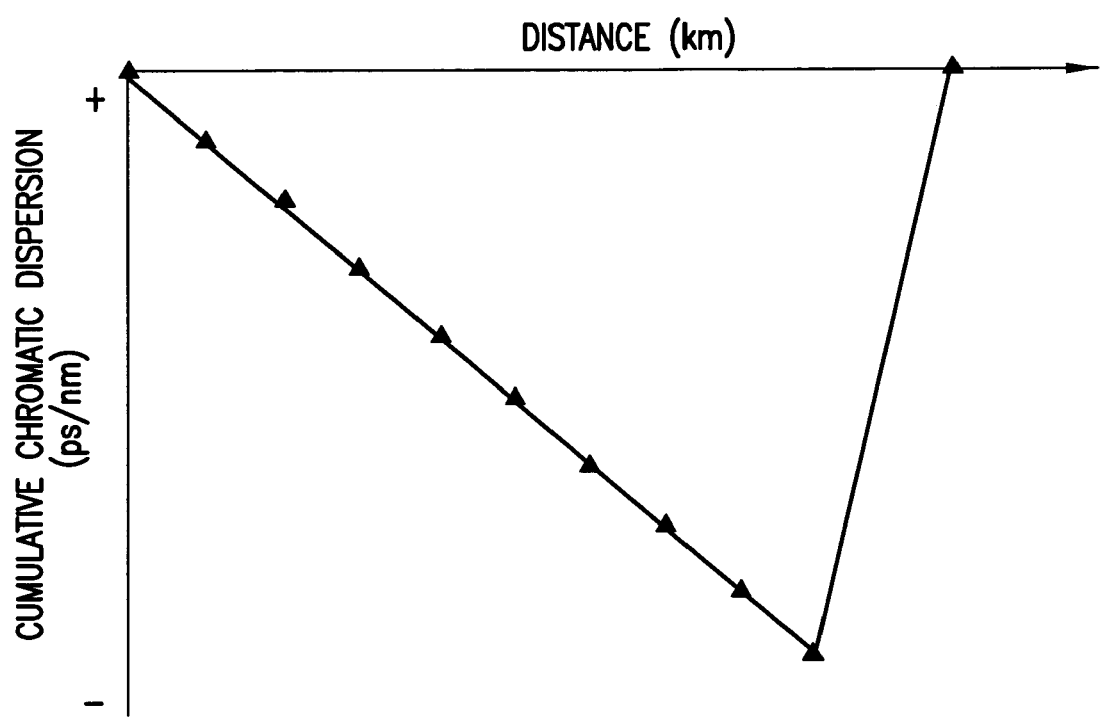
FIG. 12 illustrates a dispersion map based on average dispersion in the individual cable spans for one embodiment of a dispersion managed cable block including nine transmission spans and one compensation span.
Figure 13:
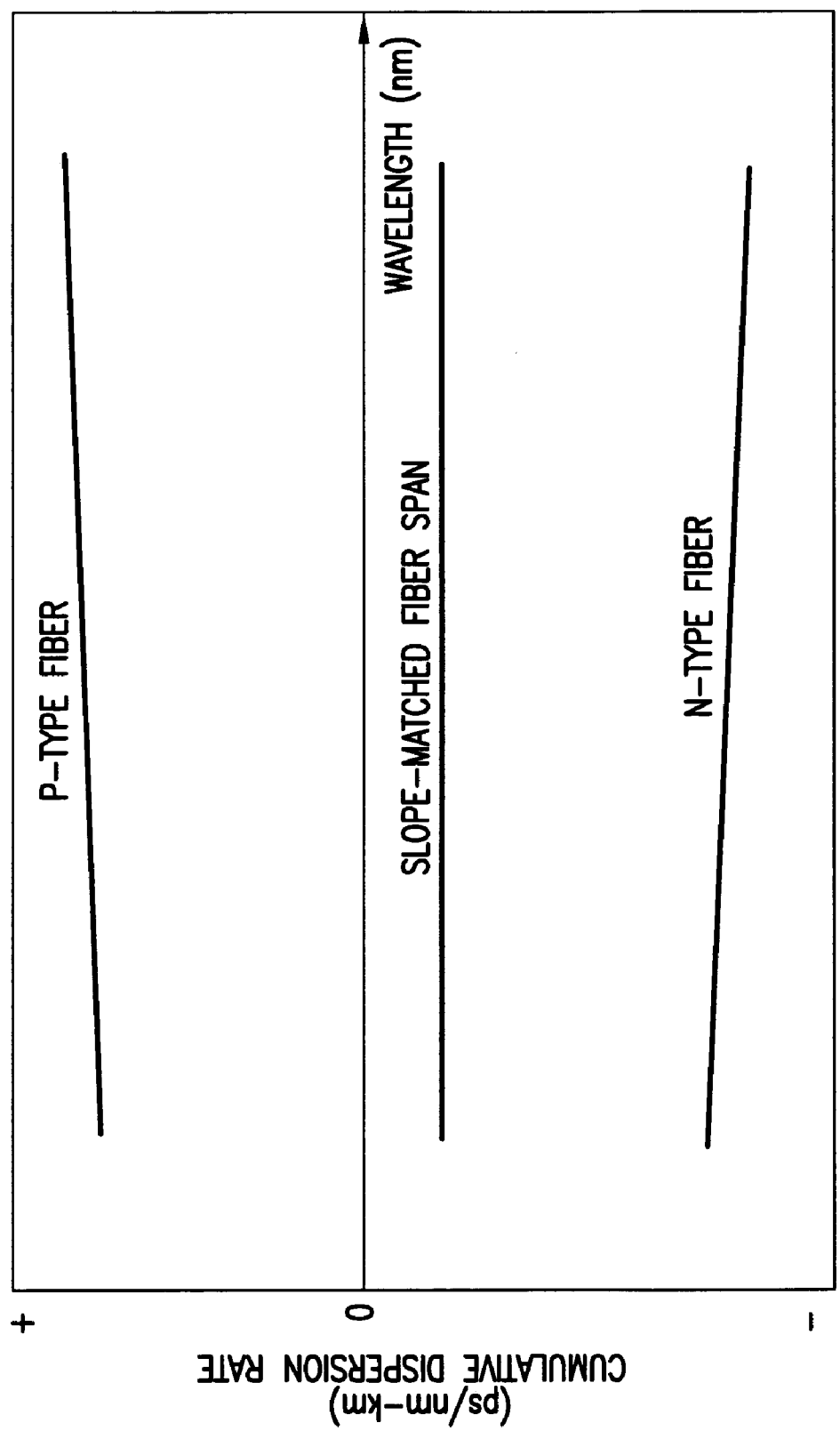
FIG. 13 illustrates chromatic dispersions for P-type fibers, N-type fibers and a slope-matched fiber span, according to one embodiment of the present invention.
Figure 14:
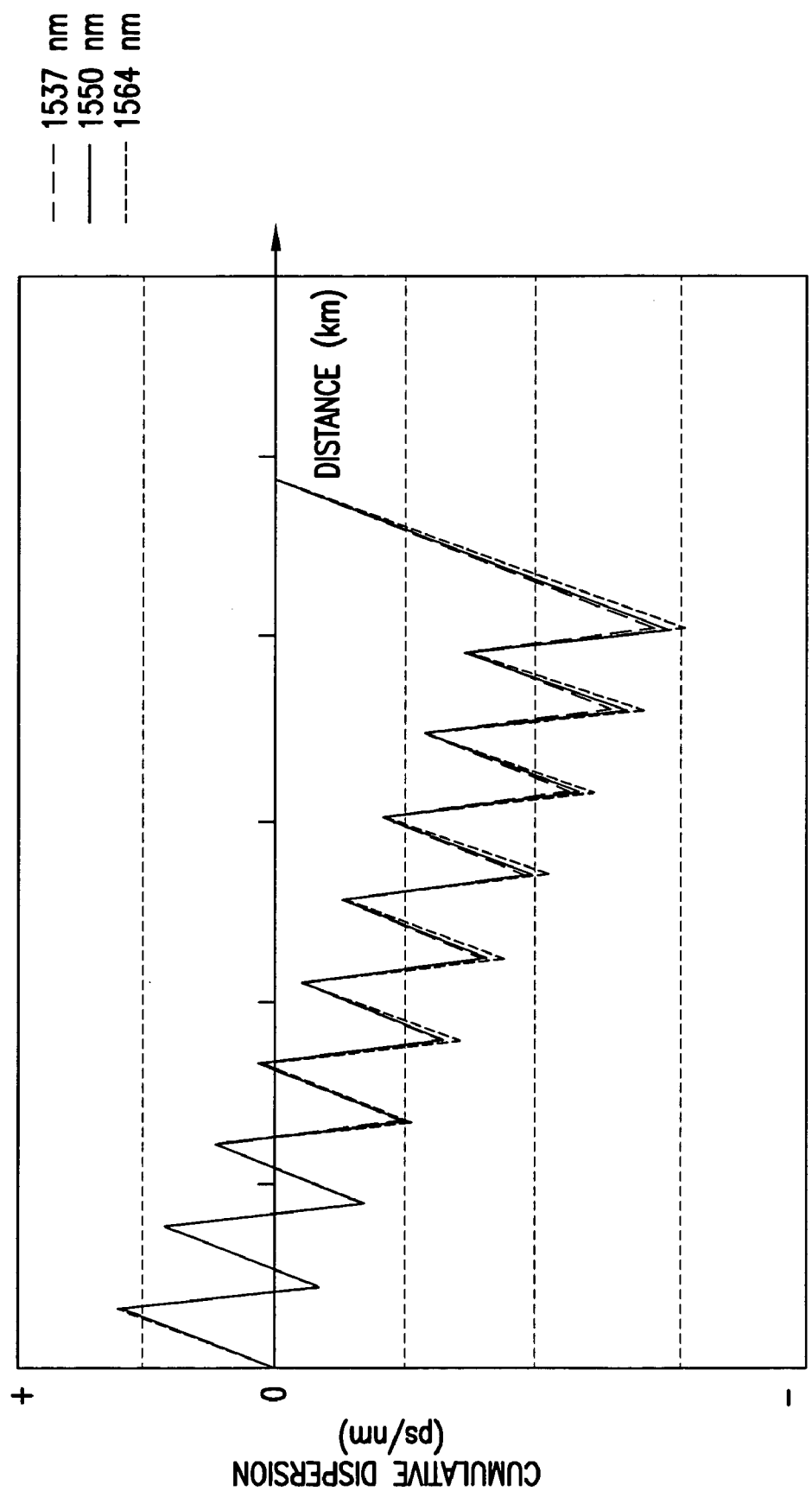
FIG. 14 illustrates a dispersion map for one embodiment of a cable block including nine transmission spans and one compensation span in a slope-matched cable system.

The transmission cable spans including the dispersion-managed transmission lines, as described above, are preferably used in a dispersion-managed cable block including a series of transmission cable spans and a compensation cable span. The compensation cable span compensates the cumulative dispersion from the transmission cable spans. The cumulative dispersions on both opposite transmission directions from the series of transmission cable spans can be balanced by trimming on one end or adding cables on another end of one or two transmission spans. FIG. 12 shows a typical dispersion map from the mean dispersion characteristics at 1550 nm of each cable span for a dispersion-managed cable block with nine (9) transmission cable spans and one (1) compensation cable spans. FIG. 13 shows the chromatic dispersions for the P-type fiber and N-type fiber compared to the chromatic dispersion for a slope-matched fiber span. FIG. 14 shows a typical dispersion map for a cable block with nine (9) transmission cable spans and one (1) compensation cable span in a slope-matched fiber cable system at channels of wavelengths of 1537 nm, 1550 nm and 1564 nm.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

The invention claimed is:

1. An optical cable comprising:
   at least one first direction transmission line for transmitting an optical signal in a first direction along said cable, said first direction transmission line being made from a first type of unitary fiber;
   at least one second direction transmission line for transmitting an optical signal in a second direction along said cable, said second direction transmission line being made from a second type of unitary fiber, wherein said second type of unitary fiber is different from said first type of unitary fiber;
   wherein each of said unitary fibers has a main transmission section plus a leading length extension and a trailing length extension on either end of said main transmission section, wherein said main transmission section includes a combination of P-type fibers and N-type fibers arranged according to transmission direction, wherein said leading length extension and a first fiber in said main transmission section are in the same constituent fiber and wherein said trailing length extension and a last fiber in said main transmission section are in the same constituent fiber, and wherein said leading length extension and said trailing length extension in each of said unitary fibers are different fiber types; and
   wherein said leading length extensions in said first direction transmission line and said second direction transmission line have substantially the same length, and wherein said trailing length extensions in said first direction transmission line and said second direction transmission line have substantially the same length.

2. The optical cable of claim 1 wherein said leading length extension of said first type of unitary fiber is formed by a section of a first P-type fiber extending continuously from said main transmission section, wherein said trailing length extension of said first type of unitary fiber is formed by a section of a last N-type fiber extending continuously from said main transmission section, wherein said leading length extension of said second type of unitary fiber is formed by a section of a first N-type fiber extending continuously from said main transmission section, wherein said trailing length extension of said second type of unitary fiber is formed by a section of a last P-type fiber extending continuously from said main transmission section.

3. The optical cable of claim 2 wherein said combination of said P-type fibers and said N-type fibers in said first direction transmission line and said second direction transmission line includes said P-type fibers on an upstream transmission side and said N-type fibers on a downstream transmission side.

4. The optical cable of claim 1 wherein one or more of said P-type fibers is spliced directly to one or more of said N-type fibers.

5. The optical cable of claim 1 wherein one or more of said P-type fibers is spliced to one or more of said N-type fibers using a bridge fiber.

6. The optical cable of claim 5 wherein said bridge fiber is a fiber suitable for single mode operation, and wherein said bridge fiber optimizes loss characteristics of a connection between said one or more of said P-type fibers and said one or more of said N-type fibers.

7. The optical cable of claim 1 wherein said P-type fibers and said N-type fibers have the ratio between the temperature coefficients of their chromatic dispersions closely matched to the ratio between their chromatic dispersions at an interested wavelength.

8. The optical cable of claim 2 wherein said P-type fiber and said N-type fiber in said length extensions have transmission properties at least close to nominal transmission properties of said P-type fibers and N-type fibers, respectively in said main transmission section.

9. The optical cable of claim 1 further comprising a loss build out (LBO) unit connected to an input end of at least one of said transmission lines.

10. The optical cable of claim 1 further comprising a plurality of pairs of said first direction transmission line and said second direction transmission line.

11. The optical cable of claim 10 wherein said P-type fibers in one of said pairs of transmission lines has a first color, and wherein said N-type fibers in said one of said pairs of transmission lines has a second color.

12. The optical cable of claim 11 wherein each of said pairs uses different colors for said P type fibers and said N-type fibers.

13. The optical cable of claim 12 wherein a total number of colors is equal to a number of transmission lines.

14. A process for making an optical cable, said process comprising:
    providing first and second types of unitary fiber, each of said first and second types of unitary fiber having a main transmission section and a leading length extension and a trailing length extension on either end of said main transmission section, wherein said main transmission section includes a combination of P-type fibers and N-type fibers, wherein said second type of unitary fiber is different from said first type of unitary fiber, wherein said leading length extension and a first fiber in said main transmission section are in the same constituent fiber and wherein said trailing length extension and a last fiber in said main transmission section are in the same constituent fiber, and wherein said leading length extension and said trailing length extension in each of said unitary fibers are different fiber types;
    arranging said first and second types of unitary fiber to form at least one pair of transmission lines, wherein said leading length extensions and said trailing length extensions of said first and second unitary fibers are arranged together; and
    trimming at least a portion of said pair of transmission lines such that desired transmission characteristics are substantially maintained.

15. The process of claim 14 wherein the step of providing said first and second types of unitary fiber comprises:
    determining lengths of said leading and trailing length extensions based on statistical cable production data;
    determining lengths of said P-type fibers in said main transmission section based on requirements of said transmission lines and fiber transmission properties;
    determining lengths of said N-type fibers in said main transmission section based on requirements of said transmission lines and fiber transmission properties;
    determining lengths of first and last constituent fibers in said unitary fiber by adding lengths of said leading and trailing extensions, respectively, to the lengths of first and last fibers in said main transmission section, respectively; and
    splicing said P-type fibers and said N-type fibers to form said unitary fiber.

16. The process of claim 15 further comprising the steps of coloring said P-type fibers a first color and coloring said N-type fibers a second color, before splicing said P-type fibers and said N-type fibers.

17. The process of claim 14 wherein the step of providing said first and second types of unitary fiber comprises the steps of:
    determining lengths of said leading and trailing length extensions based on statistical cable production data;
    determining transmission requirements of said unitary fiber based on requirements of said transmission lines, said leading and trailing length extensions, and fiber transmission properties;
    determining lengths of said P-type fibers in said unitary fiber based on said requirements of said unitary fiber, a fiber configuration in said transmission line, and said fiber transmission properties;
    determining lengths of said N-type fibers in said unitary fiber based on said requirements of said unitary fiber, a fiber configuration in said transmission line, and said fiber transmission properties;
    arranging said P-type fibers and said N-type fibers according to said fiber configuration; and
    splicing said P-type fibers and said N-type fibers to form said unitary fiber.

18. The process of claim 14 wherein the step of arranging said first and second types of unitary fibers includes arranging said first and second types of unitary fibers to form multiple pairs of said transmission lines.

19. The process of claim 14 wherein the step of trimming at least a section of said pair of transmission lines includes trimming ends of said transmission lines.

20. The process of claim 14 wherein the step of trimming at least a section of said pair of transmission lines includes removing a section of said pair of transmission lines between an end of said transmission lines and a transition to all P-type fibers.

21. The process of claim 14 further comprising connecting a loss build out (LBO) to an input end of at least one of said transmission lines.

22. A process for making a unitary fiber from P-type fibers and N-type fibers, said unitary fiber to be used as a transmission line, comprising:
    determining fiber lengths of leading and trailing length extensions of said unitary fiber based on statistical cable production data, wherein said leading and trailing length extension are different fiber types;
    determining fiber lengths of said P-type fibers in a main transmission section of said unitary fiber based on requirements of the transmission line and fiber transmission properties;
    determining fiber lengths of said N-type fibers in said main transmission section of said unitary fiber based on requirements of the transmission line and fiber transmission properties;
    determining lengths of first and last constituent fibers in said unitary fiber by adding lengths of said leading and trailing extensions, respectively, to the lengths of first and last fibers in said main transmission section, respectively; and
    splicing said P-type fibers and said N-type fibers to form said unitary fiber with said first and last fibers at ends of said unitary fiber such that said leading trailing and extensions are in the same constituent fibers as said first and last fibers, respectively, in said main transmission section of said unitary fiber.

23. The process of claim 22 further comprising the steps of coloring said P-type fibers a first color and coloring said N-type fibers a second color.

24. The process of claim 22 wherein the step of splicing includes splicing one or more of said P-type fibers to one or more of said N-type fibers using a bridge fiber.

25. A unitary fiber made according to the process of claim 22.

26. A process for making a unitary fiber from P-type fibers and N-type fibers, said unitary fiber to be used as a transmission line, comprising:

determining lengths of leading and trailing length extensions of said unitary fiber based on statistical cable production data, wherein said leading trailing length extensions are different fiber types;

determining transmission requirements of said unitary fiber based on requirements of said transmission line, and fiber transmission properties;

determining lengths of said P-type fibers in said unitary fiber based on said transmission requirements of said unitary fiber, a fiber configuration in said transmission line, and said fiber transmission properties;

determining lengths of said N-type fibers in said unitary fiber based on said transmission requirements of said unitary fiber, a fiber configuration in said transmission line, and said fiber transmission properties;

arranging said P-type fibers and said N-type fibers according to said fiber configuration; and splicing said P-type fibers and said N-type fibers to form said unitary fiber such that said leading and trailing length extensions are in the same constituent fibers as first and last fibers, respectively, in a main transmission section of said unitary fiber.

27. The process of claim 26 further comprising the steps of coloring said P-type fibers a first color and coloring said N-type fibers a second color.

28. The process of claim 26 wherein the step of splicing includes splicing one or more of said P-type fibers to one more of said N-type fibers using a bridge fiber.

29. A unitary fiber made according to the process of claim 26.

* * * * *